United States Patent
Park

(10) Patent No.: US 7,324,504 B2
(45) Date of Patent: Jan. 29, 2008

(54) SYSTEM FOR AUTOMATICALLY UPGRADING FIRMWARE OF INTERNET VIDEO PHONES AND METHOD OF MANAGING THE SAME

(75) Inventor: Hye-Kyung Park, Seoul (KR)

(73) Assignee: C & S Technology Co., Ltd., Seoul (KR)

( * ) Notice: Subject to any disclaimer, the term of this patent is extended or adjusted under 35 U.S.C. 154(b) by 523 days.

(21) Appl. No.: 11/049,214

(22) Filed: Feb. 2, 2005

(65) Prior Publication Data

US 2005/0174994 A1  Aug. 11, 2005

(30) Foreign Application Priority Data

Feb. 10, 2004 (KR) .................. 10-2004-0008545

(51) Int. Cl.
*H04L 12/66* (2006.01)
(52) U.S. Cl. ..................... 370/352; 370/493
(58) Field of Classification Search ............... None
See application file for complete search history.

(56) References Cited

U.S. PATENT DOCUMENTS

| | | | |
|---|---|---|---|
| 6,157,618 A * | 12/2000 | Boss et al. ............ 370/252 |
| 6,370,141 B1 * | 4/2002 | Giordano et al. ............ 370/386 |
| 6,744,759 B1 * | 6/2004 | Sidhu et al. ............ 370/356 |
| 2001/0046237 A1 * | 11/2001 | Chan et al. ............ 370/419 |
| 2002/0196776 A1 * | 12/2002 | Chiang ............ 370/352 |
| 2003/0227880 A1 * | 12/2003 | Heller et al. ............ 370/328 |
| 2005/0160175 A1 * | 7/2005 | Ho ............ 709/228 |
| 2005/0207432 A1 * | 9/2005 | Velez-Rivera et al. ............ 370/401 |

* cited by examiner

*Primary Examiner*—Phirin Sam
(74) *Attorney, Agent, or Firm*—Harness, Dickey & Pierce, PLC

(57) ABSTRACT

Disclosed herein is a system for automatically upgrading the firmware of Internet video phones and a method of managing the system. The system includes one or more Internet video phones, an upgrade server, and a Trivial File Transfer Protocol or Hypertext Transfer Protocol (TFTP/HTTP) server. Each of the Internet video phones has information, including a company name, a language type, a version and an Internet Protocol (IP) address, and transmits information, including changed IP information, via an Internet when the IP information changes. The upgrade server performs an update using information transmitted from the Internet video phones and transmits upgrade commands to the Internet video phones when new firmware is distributed. The TFTP/HTTP server transmits the new firmware, which is requested by the Internet video phones in response to the upgrade commands, to the Internet video phones that requested the firmware.

6 Claims, 3 Drawing Sheets

SYSTEM FOR AUTOMATICALLY UPGRADING FIRMWARE OF INTERNET VIDEO PHONES AND METHOD OF MANAGING THE SAME

BACKGROUND OF THE INVENTION

1. Field of the Invention

The present invention relates generally to a system for automatically upgrading the firmware of Internet video phones and a method of managing the system and, more particularly, to a system for automatically upgrading the firmware of video phones over the Internet and a method of managing the system.

2. Description of the Related Art

FIG. 1 is a diagram showing a conventional process of upgrading firmware. As shown in FIG. 1, Internet video phones 1 generally contain menus for upgrading firmware. When a new distribution edition is released, a technical support center 2 informs sites, at which Internet video phones 1 are installed, of the necessity of an upgrade by calling the sites, and requests users to upgrade the firmware of the Internet video phones 1 while informing the users of the address of a Trivial File Transfer Protocol or Hypertext Transfer Protocol (TFTP/HTTP) server 3. Alternatively, a manager asks the users about the addresses of the Internet video phones 1, makes accesses via Telnet and performs upgrades, or employees personally visit the sites.

As described above, the prior art is inconvenient in that the employees must visit the sites at which the Internet video phones 1 are installed, connect a serial cable to equipment and perform work within a console window, or makes accesses via Telnet and perform work. Furthermore, there is inconvenience in that the users must periodically check the version up of firmware when the users directly upgrade the firmware.

Accordingly, to eliminate such inconvenience and achieve version compatibility of the Internet video phones 1, a system and method for informing users of the release of a new distribution edition whenever the new distribution edition is released, like Windows update, are required.

SUMMARY OF THE INVENTION

Accordingly, the present invention has been made keeping in mind the above problems occurring in the prior art, and an object of the present invention is to provide a system for automatically upgrading the firmware of Internet video phones over the Internet when the firmware must be updated.

Another object of the present invention is to provide a method of managing the system for automatically upgrading the firmware of Internet video phones over the Internet when the firmware must be updated.

In order to accomplish the above object, the present invention provides a system for automatically upgrading the firmware of Internet video phones, including one or more Internet video phones each configured to have information including a company name, a language type, a version and an IP address, and to transmit information including changed IP information via an Internet when the IP information changes; an upgrade server for updating information transmitted from the Internet video phones and transmitting upgrade commands to the Internet video phones when new firmware is distributed; and a TFTP/HTTP server for transmitting the new firmware, which is requested by the Internet video phones in response to the upgrade commands, to the Internet video phones that requested the firmware. In this case, the system may further include an upgrade DB that communicates with the upgrade server and stores information on the Internet video phones, including the changed IP information.

In order to accomplish the above object, the present invention provides a method of managing a system for automatically upgrading the firmware of Internet video phones, the system having one or more Internet video phones, an upgrade server connected to the Internet video phones via a network to transmit firmware upgrade messages to the Internet video phones, and a TFTP/HTTP server connected to the Internet video phones via a network to transmit the firmware; the method including the steps of the first step of transmitting a company name, language information, a version and IP information from the Internet video phones to the upgrade server; the second step of updating the upgrade server using the transmitted information; the third step of transmitting upgrade commands to the Internet video phones when new firmware is distributed; the fourth step of transmitting firmware requests from the Internet video phone to the TFTP/HTTP server; and the fifth step of transmitting the firmware from the TFTP/HTTP server to the Internet video phones in response to the firmware requests. In this case, the method may further include the step of transmitting changed IP information to the upgrade server when the IP information of the Internet video phones changes, before the first step. Furthermore, the method may further include the step of periodically informing one or more of the Internet video phones of the upgrade of the firmware by periodically transmitting upgrade messages if the firmware requests are not made by the one or more Internet video phones.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

An Internet video phone refers to equipment that additionally provides a video service to a system or service that uses Internet phones as general phones by receiving and transmitting voice through the Internet phones and the Internet. Such an Internet phone is generally controlled by a system image stored in programmable Read-Only Memory (ROM), which is called firmware. Firmware is distributed when the functionality of equipment is improved or a bug is corrected. Users can be provided with more stable services by upgrading Internet video phones.

Internet video phones equipped with automatic firmware upgrade functionality periodically communicate with an upgrade server and automatically upgrade firmware when a function is added to the firmware or the correction of a bug is required. The Internet video phones periodically report the location information thereof to assist the upgrade server's management activity, and recommends that the users upgrade firmware in a timely manner by periodically informing the users of the release of a new distribution edition.

With reference to the accompanying drawings, preferred embodiments of the present invention are described below.

Figure 1:
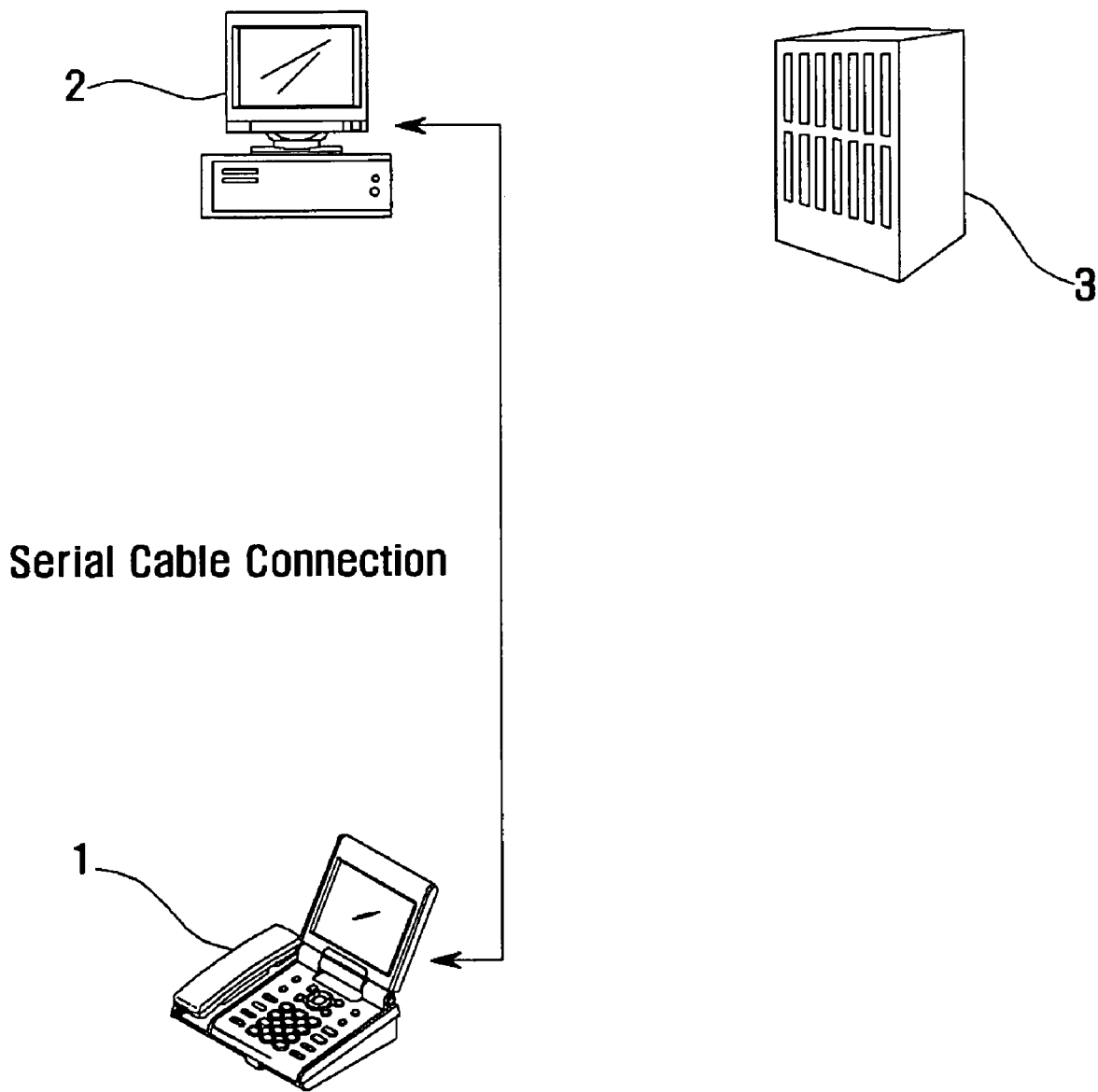
FIG. 1 is a schematic diagram showing a conventional process of upgrading firmware.
Figure 2:
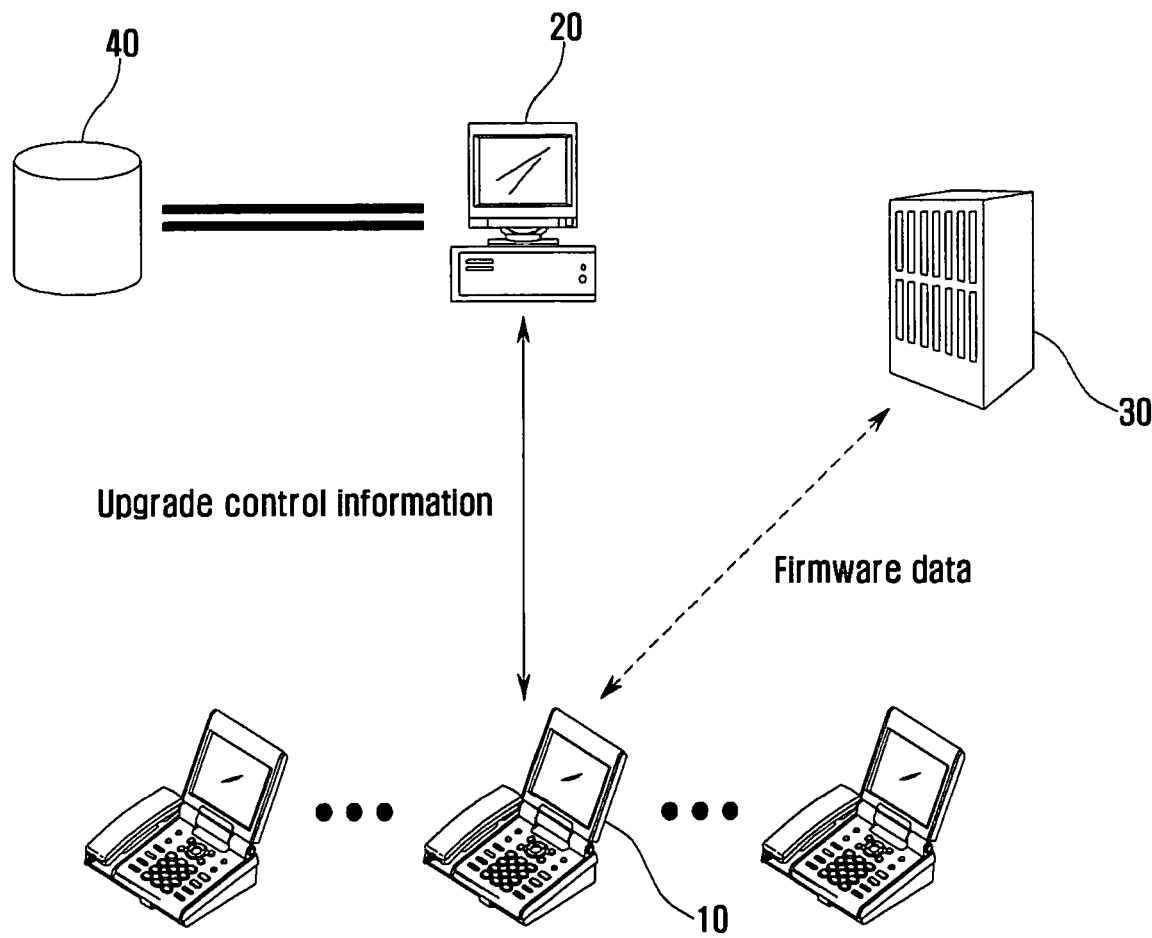
FIG. 2 is a configuration diagram of a system for upgrading Internet video phones in accordance with the present invention.

FIG. 2 is a configuration diagram of a system for upgrading Internet video phones in accordance with the present invention. As shown in FIG. 2, to perform the automatic upgrade of the present invention, an upgrade server 20 having information on the locations of the Internet video phones (or Internet Protocol (IP) phones) 10 and a TFTP or HTTP server (TFTP/HTTP server) 30 having firmware are basically required. Furthermore, an upgrade DataBase (DB) 40 is further included.

To increase the convenience of the automatic firmware upgrade, the Internet video phones 10 can receive upgrade messages via the Internet by reporting a company name, a language type and a version, along with a changed IP address, to the upgrade server 20 when the IP address changes.

After such an environment has been established, a manager informs the users of the distribution of new version firmware using User Datagram Protocol (UDP) messages so as to allow the users to upgrade the Internet video phones 10.

When a UDP message reaches an appointed UDP port, an Internet video phone 10 opens a popup window and asks a user whether he or she wishes to upgrade firmware. If the user wants an upgrade, the upgrade is attempted through the TFTP/HTTP server 30. If the user refuses the upgrade or there is no input, a setting is made to periodically activate an upgrade alarm, so that the user can attempt the upgrade later.

If the upgrade of the firmware is successful, the upgrade server 20 is informed of the success of the upgrade so that the upgrade server 20 does not transmit an upgrade message any more. The activation of the upgrade alarm is terminated.

Figure 3:
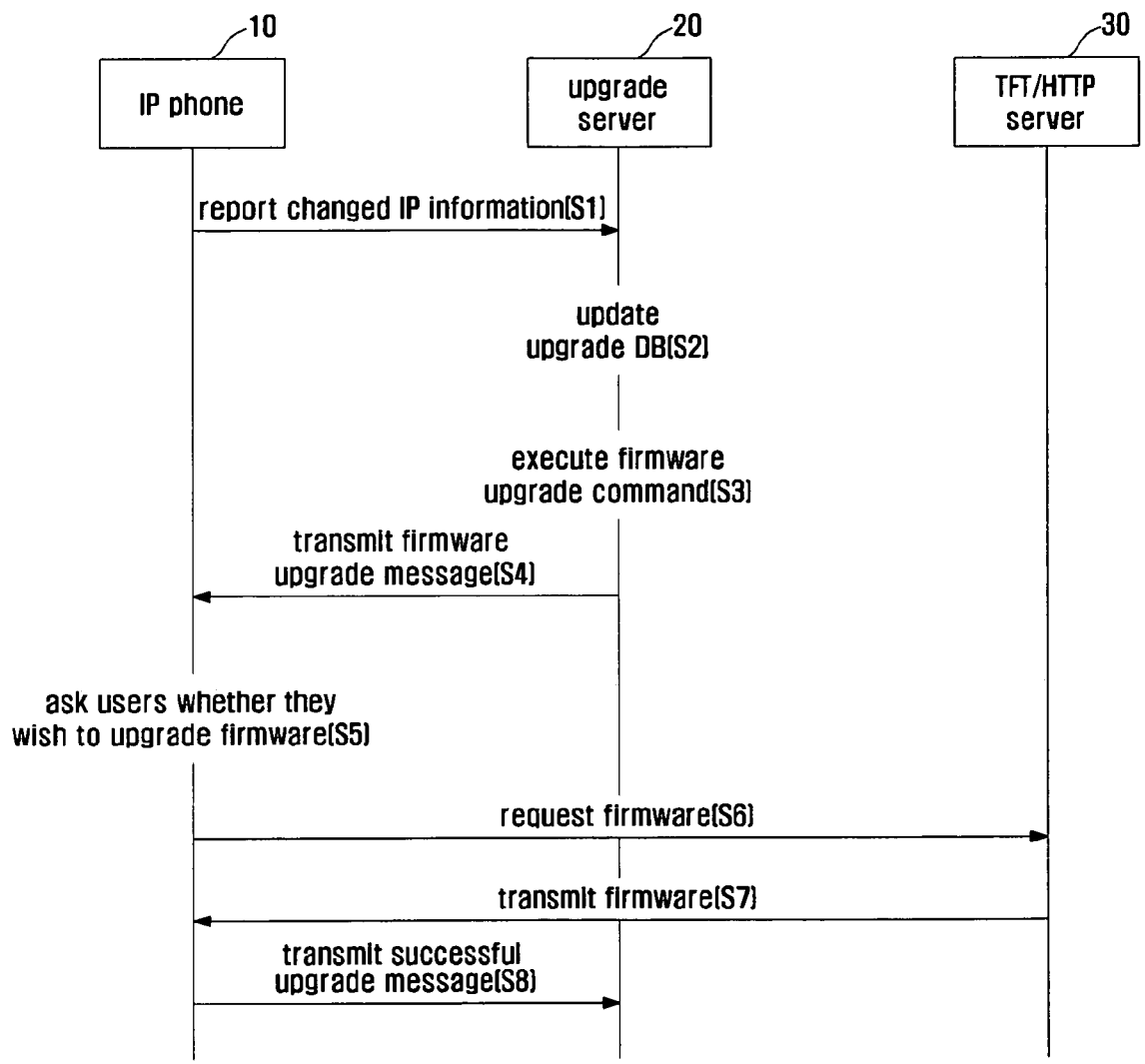
FIG. 3 is a diagram showing a method of managing the system for automatically upgrading the firmware of Internet video phones.

FIG. 3 is a diagram showing a method of managing the system for automatically upgrading the firmware of Internet video phones.

The automatic upgrade of firmware is performed through communication between the upgrade server 20 and the TFTP/HTTP server 30 having the firmware. To communicate with the upgrade server 20, a preceding step, at which the Internet video phones 10 report changed IP addresses to the upgrade server 20 when the IP addresses thereof changes, is required.

Referring to FIG. 3, when information on the IP address of an Internet video phone 10 changes, the change in IP information is reported to the upgrade server 20 at step S1.

The upgrade server 20 receives the changed IP information, and updates the upgrade DB 40 with changed IP information, a company name, language information and a firmware version at step S2.

In this case, when new firmware is distributed, the manager executes an upgrade command by manipulating the upgrade server 20 at step S3, and transmits firmware upgrade messages to the Internet video phones 10 at step S4.

When receiving the upgrade messages, the Internet video phones 10 inform the users of the distribution of the new firmware by opening popup windows, and ask the users whether they wish to upgrade firmware at step S5.

If a use wants an upgrade using the new firmware, the firmware is requested from the preset TFTP/HTTP server 30 at step S6. Accordingly, the TFTP/HTTP server 30 transmits the firmware to the user at step S7.

Meanwhile, if an image upgrade is completed in the Internet video phone 10, the Internet video phone 10 transmits a successful upgrade message to the upgrade server 20 at step S8.

As described above, the present invention provides the system for automatically upgrading the firmware of Internet video phones and the method of managing the system, which can not only eliminate the inconvenience of requesting users to upgrade firmware by informing users of the firmware upgrade via wired connections whenever a request for the upgrade of firmware is raised, but can also eliminate a version incompatibility problem that may be caused by the omission of an upgrade alarm.

In accordance with the present invention, the Internet video phones are equipped with automatic firmware upgrade functionality, so that the cost of the Internet video phones can be lowered because manpower for the maintenance and repair of the Internet video phones is reduced, and the reliable operation of the Internet video phones is ensured because firmware can be stably distributed to users in a timely manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for automatically upgrading firmware of Internet video phones, comprising:
   one or more Internet video phones each configured to have information including a company name, a language type, a version and an Internet Protocol (IP) address, and to transmit information including changed IP information via an Internet when the IP information changes;
   an upgrade server for updating information transmitted from the Internet video phones and transmitting upgrade commands to the Internet video phones when new firmware is distributed; and
   a Trivial File Transfer Protocol or Hypertext Transfer Protocol (TFTP/HTTP) server for transmitting the new firmware, which is requested by the Internet video phones in response to the upgrade commands, to the Internet video phones that requested the firmware.

2. The system as set forth in claim 1, further comprising an upgrade Database (DB) that communicates with the upgrade server and stores information on the Internet video phones, including the changed IP information.

3. A method of managing a system for automatically upgrading firmware of Internet video phones, the system having one or more Internet video phones, an upgrade server connected to the Internet video phones via a network to transmit firmware upgrade messages to the Internet video phones, and a TFTP/HTTP server connected to the Internet video phones via a network to transmit the firmware; the method comprising the steps of:
   the first step of transmitting a company name, language information, a version and IP information from the Internet video phones to the upgrade server;
   the second step of updating the upgrade server using the transmitted information;
   the third step of transmitting upgrade commands to the Internet video phones when new firmware is distributed;
   the fourth step of transmitting firmware requests from the Internet video phone to the TFTP/HTTP server; and the fifth step of transmitting the firmware from the TFTP/HTTP server to the Internet video phones in response to the firmware requests.

4. The method as set forth in claim 3, further comprising, before the first step, the step of transmitting changed IP information to the upgrade server when the IP information of the Internet video phones changes.

5. The method as set forth in claim 3, further comprising the step of periodically informing one or more of the Internet video phones of the upgrade of the firmware by periodically transmitting upgrade messages if the firmware requests are not made by the one or more Internet video phones.

6. The method as set forth in claim 4, further comprising the step of periodically informing one or more of the Internet video phones of the upgrade of the firmware by periodically transmitting upgrade messages if the firmware requests are not made by the one or more Internet video phones.

* * * * *